United States Patent Office 3,271,339
Patented Sept. 6, 1966

3,271,339
POLYOLEFIN STABILIZERS COMPRISING ESTERS OF THIODIETHYLENEGLYCOL AND HYDROXYPHENYL BENZOTRIAZOLES
Vittorio Cappuccio, Alberto Bonvicini, and Cornelio Caldo, Terni, Italy, assignors to Montecatini Società Generale per l'Industria Mineraria e Chimica, Milan, Italy
No Drawing. Filed Feb. 12, 1963, Ser. No. 257,857
Claims priority, application Italy, Feb. 13, 1962, 2,825/62
13 Claims. (Cl. 260—23)

The present invention relates to stabilized polymeric compositions containing poly-alpha-olefins and to a process for stabilizing polymeric compositions including shaped articles such as fibers, films and other manufactured articles which contain poly-alpha-olefins.

It is known that poly-alpha-olefins undergo a certain amount of degradation when worked or processed under hot conditions, particularly in the presence of atmospheric oxygen.

It is also known that manufactured or shaped articles of poly-alpha-olefins are sensitive to the action of light and thermal treatments.

This sensitivity, which causes degradation of the poly-alpha-olefins, can be reduced by addition of particular protective substances to the polymer, particularly during the preparation of the fibers, films, etc.

In general, small proportions of substances such as amines, aminophenols, chelates of transistion metals (for example, Ni), organotin compounds, triazolic compounds, zinc compounds, dithiocarbamates, phenols, phosphites, mercaptans, oximes, polyquinolines, sulfur derivatives, silicones, thiophosphites and the like are employed as the protective substances.

We have now surprisingly found, according to the present invention, that a composition comprising:

(a) An aliphatic thioester obtained by esterification of $\beta\beta'$-thiodipropionic acid with a long chain aliphatic alcohol, or a thioester obtained by esterification of thiodiethylene glycol with a long chain aliphatic acid, as described in commonly assigned U.S. application Serial No. 127,987, filed July 31, 1961;

(b) A hydroxybenzotriazolic compound, which may be substituted with groups such as halogens, alkyl groups and the like; and (c) A phenol compound, which may be substituted with alkyl groups, halogens and the like, possesses high stabilizing activity when admixed with alpha-olefin polymers suitable for producing manufactured or shaped articles such as fibers, films, etc.

These stabilizing compositions are employed in amounts equal to or less than 2% by weight of the poly-alpha-olefin. More particularly, these compositions are used in the proportions of from about 0.02 to 2%, preferably from about 0.2 to 1%, based on the weight of the poly-alpha-olefin.

The stabilizers of the present invention are also suitable for the stabilization of poly-alpha-olefins colored by addition of organic or inorganic dyeing pigments to the polymer-stabilizer composition before the extrusion thereof.

Thus, in accordance with the present invention polymeric compositions are produced, which are stable against the action of heat, ageing and light. These compositions comprise:

(a) A poly-alpha-olefin, particularly polypropylene prevailingly (more than 50%) consisting of isotactic macromolecules;

(b) Between about 0.2 and about 2% by weight of a stabilizer comprising a long chain aliphatic thioester, an hydroxybenzotriazolic compound and a phenolic compound.

Conventional additives such as pigments, dyes, fillers and the like can, of course, be employed with these polymeric compositions.

Moreover, the addition of anti-acid substances, such as e.g., the inorganic salts of stearic acid (e.g., calcium stearate), before a shaping or extrusion operation improves the stability characteristics of these polymeric compositions.

Particularly suitable aliphatic thioesters are those wherein the aliphatic radical contains 8–30 carbon atoms, these include:

Esters of $\beta\beta'$-thiodipropionic acid, such as lauryl thiodipropionate; and
Esters of thiodiethyleneglycol, such as the didodecyl ester,

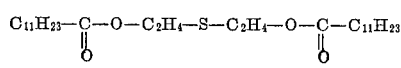

the dioctadecylester,

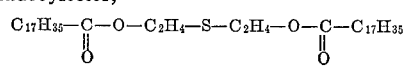

and the like.

Particularly suitable hydroxybenzotriazolic compounds include those having the general formula:

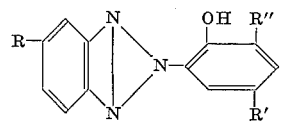

wherein R is a halogen, a hydrogen, an alkyl, aryl or hydroxy group and R' and R" are each selected from alkyl groups, aryl groups or hydrogen atoms; e.g., 2'-hydroxy-3'-tertiary butyl-5'-methyl-phenyl-5-chlorobenzotriazole and 2'-hydroxy-5'-tertiary butyl-phenyl-5-chlorobenzotriazole, having the following formulas, respectively:

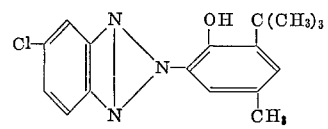

and

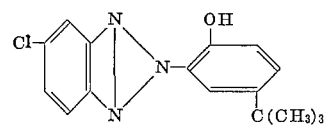

Phenolic compounds which are particularly suitable for use in the stabilizers of the present invention include 4,4'-thiobis-6-tertiary butyl metacresol and polyphenols obtained by condensation of aldehydes such as formaldehyde, or ketones such as acetone with alkyl phenols (e.g., those described in Belgian Patent 571,035 and in Italian Patent 536,250).

The stabilizer may contain either the hydroxybenzotriazolic compound or the thioesters in proportions of from 20–60%. A combination of the hydroxybenzotriazolic compound and the aliphatic thioester may comprise from about 1–99% by weight of the stabilizing mixture or agent.

The hydroxybenzotriazoles that can be used according to the present invention may be obtained by any of the known methods for preparing such compounds, e.g., (a) the oxidation of aminoazo compounds of the formula:

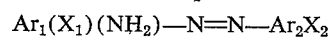

wherein $X_1$ and $X_2$ each represents hydroxyl, carboxyl, halogen and alkyl groups, or hydrogen atoms (see U.S. Patent 2,362,988 and British Patents 555,971 and 556,143)

and $Ar_1$ and $Ar_2$ are aromatic radicals, possibly substituted with alkyls, halogens, hydroxyls; or (b) the reduction of nitroazo compounds of the formula:

$$Ar_1(X_1)(NO_2)-N=N-Ar_2X_2$$

wherein $X_1$, $X_2$, $Ar_1$ and $Ar_2$ have the aforementioned meaning (see, for example, Ann. 511, 241–267, 1934).

The spinning of the stabilized polymeric compositions of the present invention is preferably carried out by extrusion through spinnerets with holes having a length to diameter ratio higher than 1.

The resulting yarns are subjected to a stretching treatment using stretching ratios between 1:2 and 1:10, at temperatures between 80° and 150° C. in stretching devices which are heated with hot air, steam, a similar fluid or with a heating plate.

The stabilizers are, in general, employed by admixing them with the poly-alpha-olefins while agitating.

The stabilizers, however, can also be added by other methods such as, for example, by mixing the poly-alpha-olefins with a solution of the stabilizer in a suitable solvent and then evaporating the solvent, or by adding the stabilizer to the poly-alpha-olefins at the end of the polymerization.

It is also possible to achieve stabilizing action by applying the stabilizing compounds onto the manufactured article obtained from the poly-alpha-olefin, e.g., by immersing said articles in a solution or dispersion of the stabilizer and then evaporating the solvent.

The stabilizing compounds of the present invention possess good compatibility with the poly-alpha-olefins in the molten state and do not stain the polymers.

The stabilized polymer compositions of the present invention are particularly suitable for preparing mono- and pluro-filaments, staple, bulk yarns, films, tapes and other shaped articles.

The following examples, which are reported in the following Tables I, II, III and IV, are given to illustrate the present invention without limiting its scope.

All parts and proportions are by weight unless otherwise indicated.

The intrinsic viscosity $[\eta]$ of the polypropylene is determined in tetrahydronaphthalene at 135° C.

TABLE I

| | Ex. 1 | Ex. 2 | Ex. 3 | Ex. 4 |
|---|---|---|---|---|
| Composition of the mix: | | | | |
| Polypropylene: | | | | |
| Intrinsic viscosity | 1.6 | 1.6 | 1.6 | 1.6 |
| Ash content, percent | 0.029 | 0.029 | 0.029 | 0.029 |
| Residue after extraction with n-heptane, percent | 94.4 | 94.4 | 94.4 | 94.4 |
| Calcium stearate, percent | 0.5 | 0.3 | 0.3 | ---------- |
| Lauryl thiodipropionate, percent | ---------- | 0.4 | 0.4 | ---------- |
| Didodecyl ester of thiodiethyleneglycol hydroxy, percent | 0.5 | ---------- | ---------- | 0.5 |
| 2',3'-tertiary butyl-5'-methylphenyl-5-chlorobenzotriazole, percent | 0.5 | 0.5 | 0.5 | 0.5 |
| 4,4'-thio-bis-6-tertiary butyl-meta-cresol, percent | 0.5 | ---------- | 0.3 | ---------- |
| Polyphenol (from formaldehyde and nonylphenol), percent | ---------- | 0.3 | ---------- | 0.3 |
| $TiO_2$, percent | 0.25 | 0.25 | 0.25 | 0.25 |
| Technology of the mix: | | | | |
| Mixer | Henschel | Henschel | Henschel | Henschel |
| Color of the mix molten in a test tube at 250° C./10' | Clear | Clear | Clear | Clear |
| Spinning conditions: | | | | |
| Screw temperature, ° C | 250 | 250 | 250 | 250 |
| Head temperature, ° C | 250 | 250 | 250 | 250 |
| Spinneret temperature, ° C | 250 | 250 | 250 | 250 |
| Spinneret type, mm | 60/0.8.16 | 60/0.8.16 | 60/0.8.16 | 60/0.8.16 |
| Max. pressure (Kg./cm.²) | 70 | 75 | 68 | 70 |
| Winding speed (m./min.) | 390 | 390 | 390 | 390 |
| Stretching conditons: | | | | |
| Temperature, ° C | 120 | 120 | 120 | 120 |
| Medium | Steam | Steam | Steam | Steam |
| Stretching ratio | 1:5 | 1:5 | 1:5 | 1:5 |
| Characteristics of the stretched yarns: | | | | |
| Tenacity (g./den.) | 5.9 | 5.6 | 5.7 | 5.5 |
| Elongation (percent) | 28 | 29 | 22 | 24 |
| Thermal degradation (percent decrease of the intrinsic viscosity by extrusion) | 81 | 83 | 70 | 78 |
| Stability to accelerated thermal ageing (percent residual tenacity after exposure at 120° C. in an air-circulated oven for 15 hours) | ---------- | 90 | 93 | 89 |
| Stability to sun light (percent residual tenacity after exposure to summer sun light for 200 hours) | 56 | 87 | 69 | 78 |

TABLE II

|  | Ex. 5 | Ex. 6 | Ex. 7 | Ex. 8 |
|---|---|---|---|---|
| Composition of the mix: |  |  |  |  |
| Polypropylene: |  |  |  |  |
| Intrinsic viscosity | 1.6 | 1.6 | 1.6 | 1.6 |
| Ash content, percent | 0.029 | 0.029 | 0.029 | 0.029 |
| Residue after extraction with n-heptane, percent | 94.4 | 94.4 | 94.4 | 94.4 |
| Calcium stearate |  |  |  |  |
| Lauryl thiodipropionate |  |  |  |  |
| Didodecyl ester of thiodiethyleneglycol |  |  |  |  |
| 2'-hydroxy-3'-tertiary butyl-5'-methyl-phenyl-5-chlorobenzotriazole |  |  |  |  |
| 4,4'-thio-bis-6-tertiary butyl-meta-cresol, percent |  | 0.3 | 0.5 |  |
| Polyphenol (from formaldehyde and nonylphenol), percent |  |  |  | 0.3 |
| $TiO_2$, percent | 0.25 |  |  |  |
| Technology of the mix: |  |  |  |  |
| Mixer | Henschel | Henschel | Henschel | Henschel |
| Color of the mix molten in a test tube at 250° C./10' | Clear | Clear | Clear | Clear |
| Spinning conditions: |  |  |  |  |
| Screw temperature, ° C | 250 | 250 | 250 | 250 |
| Head temperature, ° C | 250 | 250 | 250 | 250 |
| Spinneret temperature, ° C | 250 | 250 | 250 | 250 |
| Spinneret type, mm | 60/0.8.16 | 60/0.8.16 | 60/0.8.16 | 60/0.8.16 |
| Max. pressure (Kg./cm.$^2$) | 71 | 55 | 61 | 58 |
| Winding speed (m./min.) | 390 | 390 | 390 | 390 |
| Stretching conditions: |  |  |  |  |
| Temperature, ° C | 120 | 120 | 120 | 120 |
| Medium | Steam | Steam | Steam | Steam |
| Stretching ratio | 1:5 | 1:5 | 1:5 | 1:5 |
| Characteristics of the stretched yarns: |  |  |  |  |
| Tenacity (g./den.) | 5.5 | 5.3 | 5.5 | 5.4 |
| Elongation (percent) | 22 | 23.8 | 24 | 22 |
| Thermal degradation (percent decrease of the intrinsic viscosity by extrusion) | 71 | 71 | 74 | 78 |
| Stability to accelerated thermal ageing (percent residual tenacity after exposure at 120° C. in an air-circulated oven for 15 hours) | Brittle | 92 | 97 | 82 |
| Stability to sun light (percent residual tenacity after exposure to summer sun light for 200 hours) | 29 | 40 | 38 | 34 |

TABLE III

|  | Ex. 9 | Ex. 10 | Ex. 11 | Ex. 12 |
|---|---|---|---|---|
| Composition of the mix: |  |  |  |  |
| Polypropylene: |  |  |  |  |
| Intrinsic viscosity | 1.6 | 1.6 | 1.6 | 1.6 |
| Ash content, percent | 0.029 | 0.029 | 0.029 | 0.029 |
| Residue after extraction with n-heptane, percent | 94.4 | 94.4 | 94.4 | 94.4 |
| Calcium stearate |  |  |  |  |
| Lauryl thiodipropionate, percent | 0.4 |  | 0.4 | 0.4 |
| Didodecyl ester of thiodiethyleneglycol, percent |  | 0.5 |  |  |
| 2'-hydroxy-3'-tertiary butyl-5'-methyl-phenyl-5-chlorobenzotriazole |  |  |  |  |
| 4,4'-thio-bis-6-tertiary butyl-meta-cresol, percent |  |  | 0.3 |  |
| Polyphenol (from formaldehyde and nonylphenol), percent |  | 0.3 |  |  |
| $TiO_2$ |  |  |  |  |
| Technology of the mix: |  |  |  |  |
| Mixer | Henschel | Henschel | Henschel | Henschel |
| Color of the mix molten in a test tube at 250° C./10' | Clear | Clear | Clear | Clear |
| Spinning conditions: |  |  |  |  |
| Screw temperature, ° C | 250 | 250 | 250 | 250 |
| Head temperature, ° C | 250 | 250 | 250 | 250 |
| Spinneret temperature, ° C | 250 | 250 | 250 | 250 |
| Spinneret type, mm | 60/0.8.16 | 60/0.8.16 | 60/0.8.16 | 60/0.8.16 |
| Max. pressure (Kg./cm.$^2$) | 55 | 55 | 50 | 65 |
| Winding speed (m./min.) | 390 | 390 | 390 | 390 |
| Stretching conditions: |  |  |  |  |
| Temperature, ° C | 120 | 120 | 120 | 120 |
| Medium | Steam | Steam | Steam | Steam |
| Stretching ratio | 1:5 | 1:5 | 1:5 | 1:5 |
| Characteristics of the stretched yarns: |  |  |  |  |
| Tenacity (g./den.) | 5.6 | 5.5 | 5.4 | 5.25 |
| Elongation (percent) | 25 | 25 | 24.5 | 23 |
| Thermal degradation (percent decrease of the intrinsic viscosity by extrusion) | 71 | 73 | 72 | 76 |
| Stability to accelerated thermal ageing (percent residual tenacity after exposure at 120° C. in an air-circulated oven for 15 hours) | 85 | 85 | 86 | 85 |
| Stability to sun light (percent residual tenacity after exposure to summer sun light for 200 hours) | 41 | 41 | 42 | 40 |

TABLE IV

|  | Ex. 13 | Ex. 14 | Ex. 15 |
|---|---|---|---|
| Composition of the mix: | | | |
| Polypropylene: | | | |
| Intrinsic viscosity | 1.6 | 1.6 | 1.6 |
| Ash content, percent | 0.029 | 0.029 | 0.029 |
| Residue after extraction with n-heptane, percent | 94.4 | 94.4 | 94.4 |
| Calcium stearate | | | |
| Lauryl thiodipropionate | | | |
| Didodecyl ester of thiodiethyleneglycol-hydroxy, percent | 0.5 | 0.5 | |
| 2'-hydroxy-3'-tertiary butyl-5'-methylphenyl-5-chlorobenzotriazole, percent | | | 0.5 |
| 4,4'-thio-bis-6-tertiary butyl-meta-cresol, percent | 0.5 | | |
| Polyphenol (from formaldehyde and nonylphenol) | | | |
| TiO$_2$ | | | |
| Technology of the mix: | | | |
| Mixer | Henschel | Henschel | Henschel |
| Color of the mix molten in a test tube at 250° C./10' | Clear | Clear | Clear |
| Spinning conditions: | | | |
| Screw temperature, °C | 250 | 250 | 250 |
| Head temperature, °C | 250 | 250 | 250 |
| Spinneret temperature, °C | 250 | 250 | 250 |
| Spinneret type, mm | 60/0.8.16 | 60/0.8.16 | 60/0.8.16 |
| Max. pressure (Kg./cm.$^2$) | 50 | 65 | 65 |
| Winding speed (m./min.) | 390 | 390 | 390 |
| Stretching conditions: | | | |
| Temperature, °C | 120 | 120 | 120 |
| Medium | Steam | Steam | Steam |
| Stretching ratio | 1:5 | 1:5 | 1:5 |
| Characteristics of the stretched yarns: | | | |
| Tenacity (g./den.) | 5.5 | 5.6 | 5.5 |
| Elongation (percent) | 24 | 24.2 | 22.5 |
| Thermal degradation (percent decrease of the intrinsic viscosity by extrusion) | 75 | 74 | 80 |
| Stability to accelerated thermal ageing (percent residual tenacity after exposure at 120° C. in an air-circulated oven for 15 hours) | | 92 | Brittle |
| Stability to sun light (percent residual tenacity after exposure to summer sun light for 200 hours) | 41 | 46 | 67 |

Many variations and modifications can, of course, be practiced without departing from the spirit and scope of the present invention.

Having thus described the present invention, what it is desired to secure and claim by Letters Patent is:

1. A stabilized polymeric composition consisting essentially of a poly-alpha-olefin and from about 0.02 to 2.0% by weight of said poly-alpha-olefin of a stabilizing mixture consisting of about 20 to 60% by weight of said stabilizing mixture of an aliphatic thioester wherein the aliphatic radical contains 8–30 carbon atoms, said thioester being an ester of thiodiethyleneglycol; at least 1% by weight of said stabilizing mixture of a substituted phenolic compound; and about 20 to 60% by weight of said stabilizing mixture of an hydroxybenzotriazolic compound having the general formula:

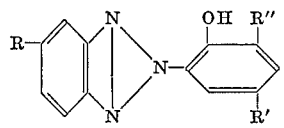

wherein R is selected from the group consisting of a halogen, hydrogen, a hydroxy group, an alkyl radical, and an aryl radical, and R' and R" are selected from the group consisting of an alkyl radical, an aryl radical, and hydrogen.

2. A stabilized polymeric composition consisting essentially of a poly-alpha-olefin and from about 0.02 to 2.0% by weight of said poly-alpha-olefin of a stabilizing mixture consisting of about 20 to 60% by weight of said stabilizing mixture of the didodecyl ester of thiodiethyleneglycol,

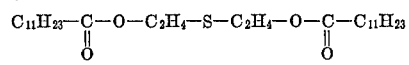

at least 1% by weight of said stabilizing mixture of a substituted phenolic compound; and about 20 to 60% by weight of said stabilizing mixture of an hydroxybenzotriazolic compound having the general formula:

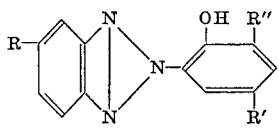

wherein R is selected from the group consisting of a halogen, hydrogen, a hydroxy group, an alkyl radical, and an aryl radical, and R' and R" are selected from the group consisting of an alkyl radical, an aryl radical, and hydrogen.

3. A stabilized polymeric composition consisting essentially of a poly-alpha-olefin and from about 0.02 to 2.0% by weight of said poly-alpha-olefin of a stabilizing mixture consisting of about 20 to 60% by weight of said stabilizing mixture of the dioctadecyl ester of thiodiethyleneglycol,

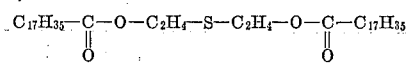

at least 1% by weight of said stabilizing mixture of a substituted phenolic compound; and about 20 to 60% by weight of said stabilizing mixture of an hydroxybenzotriazolic compound having the general formula:

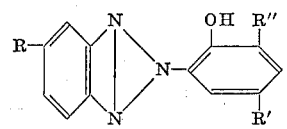

wherein R is selected from the group consisting of a halogen, hydrogen, a hydroxy group, an alkyl radical, and an aryl radical, and R' and R" are selected from the group consisting of an alkyl radical, an aryl radical, and hydrogen.

4. The stabilized polymeric composition of claim 1 wherein the poly-alpha-olefin is polypropylene prevailingly consisting of isotactic macromolecules.

5. The stabilized polymeric composition of claim 1 wherein the amount of the stabilizing mixture ranges from about 0.02 to 1.0% by weight of the poly-alpha-olefin.

6. The stabilized polymeric composition of claim 1 wherein said hydroxybenzotriazolic compound is 2-hydroxy-3-tertiary butyl-5-methyl phenyl-5-chlorobenzotriazole and said substituted phenolic compound is 4,4'-thio-bis-6-tertiary butyl meta-cresol.

7. The stabilized polymeric composition of claim 1 wherein said hydroxybenzotriazolic compound is 2-hydroxy-3-tertiary butyl-5-methyl phenyl-5-chlorobenzotriazole and said phenolic compound is a condensation product of an alkylphenol and a compound selected from the group consisting of aldehydes and ketones.

8. The stabilized polymeric composition of claim 6 wherein the aliphatic thioester is the didodecyl ester of thiodiethyleneglycol,

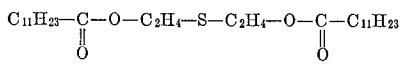

9. The stabilized polymeric composition of claim 1 wherein said hydroxybenzotriazolic compound is 2'-hydroxy-5-tertiary butyl phenyl-5-chlorobenzotriazole.

10. The stabilized polymeric composition of claim 1 wherein said phenolic compound is 4,4'-thio-bis-6-tertiary butyl meta-cresol.

11. The stabilized polymeric composition of claim 7 wherein said phenolic compound is a reaction product of formaldehyde and nonylphenol.

12. The stabilized polymeric composition of claim 1 which further contains at least 0.3% of calcium stearate.

13. The stabilized polymeric composition of claim 1 in film form.

References Cited by the Applicant

UNITED STATES PATENTS

| | | | |
|---|---|---|---|
| 2,906,733 | 9/1959 | Rader et al. | 260—45.95 |
| 2,956,982 | 10/1960 | McCall et al. | 260—45.85 |
| 3,004,896 | 10/1961 | Heller et al. | 260—45.8 |
| 3,072,604 | 1/1963 | Tholstrup | 260—45.9 |
| 3,074,909 | 1/1963 | Matlack | 260—45.9 |
| 3,074,910 | 1/1963 | Dickson | 260—45.95 |
| 3,076,782 | 2/1963 | Mohr et al. | 260—45.9 |
| 3,134,748 | 5/1964 | Costello et al | 260—45.8 |
| 3,174,946 | 3/1965 | Van Schooten | 260—45.7 |

FOREIGN PATENTS 851,670   10/1960   Great Britain.

LEON J. BERCOVITZ, *Primary Examiner.*

JOSEPH R. LIBERMAN, *Examiner.*

A. J. McNULTY, R. A. WHITE, *Assistant Examiners.*